(12) United States Patent  
Hamachi

(10) Patent No.: US 9,712,487 B2  
(45) Date of Patent: Jul. 18, 2017

(54) COMMUNICATION APPARATUS AND METHOD OF CONTROLLING SAME

(71) Applicant: CANON KABUSHIKI KAISHA, Tokyo (JP)

(72) Inventor: Toshifumi Hamachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 542 days.

(21) Appl. No.: 13/869,651

(22) Filed: Apr. 24, 2013

(65) Prior Publication Data

US 2013/0326086 A1 Dec. 5, 2013

(30) Foreign Application Priority Data

May 31, 2012 (JP) .................. 2012-125145

(51) Int. Cl.
*G06F 15/16* (2006.01)
*H04L 29/12* (2006.01)

(52) U.S. Cl.
CPC ...... *H04L 61/2007* (2013.01); *H04L 61/2015* (2013.01); *H04L 61/2046* (2013.01); *H04L 61/6022* (2013.01)

(58) Field of Classification Search
CPC ............ H04L 61/2046; H04L 61/2092; H04L 61/6059; H04L 29/1232; H04L 29/12009; H04L 61/2007; H04L 61/10; H04L 29/12254; H04L 61/206; H04L 29/12933; H04L 61/00; H04L 61/2061; H04L 29/12226; H04L 29/12801
USPC ............. 709/220, 228, 227, 229, 245, 200
See application file for complete search history.

(56) References Cited

U.S. PATENT DOCUMENTS

| 8,325,676 B2 * | 12/2012 | Chen ................... H04L 61/2015 370/331 |
| 2002/0032780 A1 * | 3/2002 | Moore .................... H04L 41/12 709/228 |
| 2004/0243722 A1 * | 12/2004 | Matsui .............. H04L 29/12264 709/249 |
| 2009/0006635 A1 * | 1/2009 | Siegmund ......... H04L 29/12028 709/228 |
| 2010/0274924 A1 * | 10/2010 | Allan .................. H04L 12/2881 709/245 |
| 2010/0332666 A1 | 12/2010 | Hamachi ....................... 709/228 |
| 2012/0113970 A1 * | 5/2012 | Hamachi ........... H04L 29/12028 370/338 |
| 2013/0166737 A1 * | 6/2013 | Christenson ............ H04L 69/40 709/224 |

FOREIGN PATENT DOCUMENTS

| JP | 2003-078541 | 3/2003 | ............. H04L 12/46 |
| JP | 2005-086350 A | 3/2005 | |
| JP | 2012-104970 | 5/2012 | .............. H04W 8/26 |

OTHER PUBLICATIONS

JP Office Action—Application No. 2012125145 dated Feb. 19, 2016.

* cited by examiner

*Primary Examiner* — Edward Kim
(74) *Attorney, Agent, or Firm* — Fitzpatrick, Cella, Harper & Scinto

(57) ABSTRACT

A first address set for a first communication interface is acquired from another apparatus. It is determined whether the first address duplicates a second address that has been set for a second communication interface. If it is determined that the first address duplicates the second address, a third address different from the first address is reacquired from the other apparatus.

19 Claims, 8 Drawing Sheets

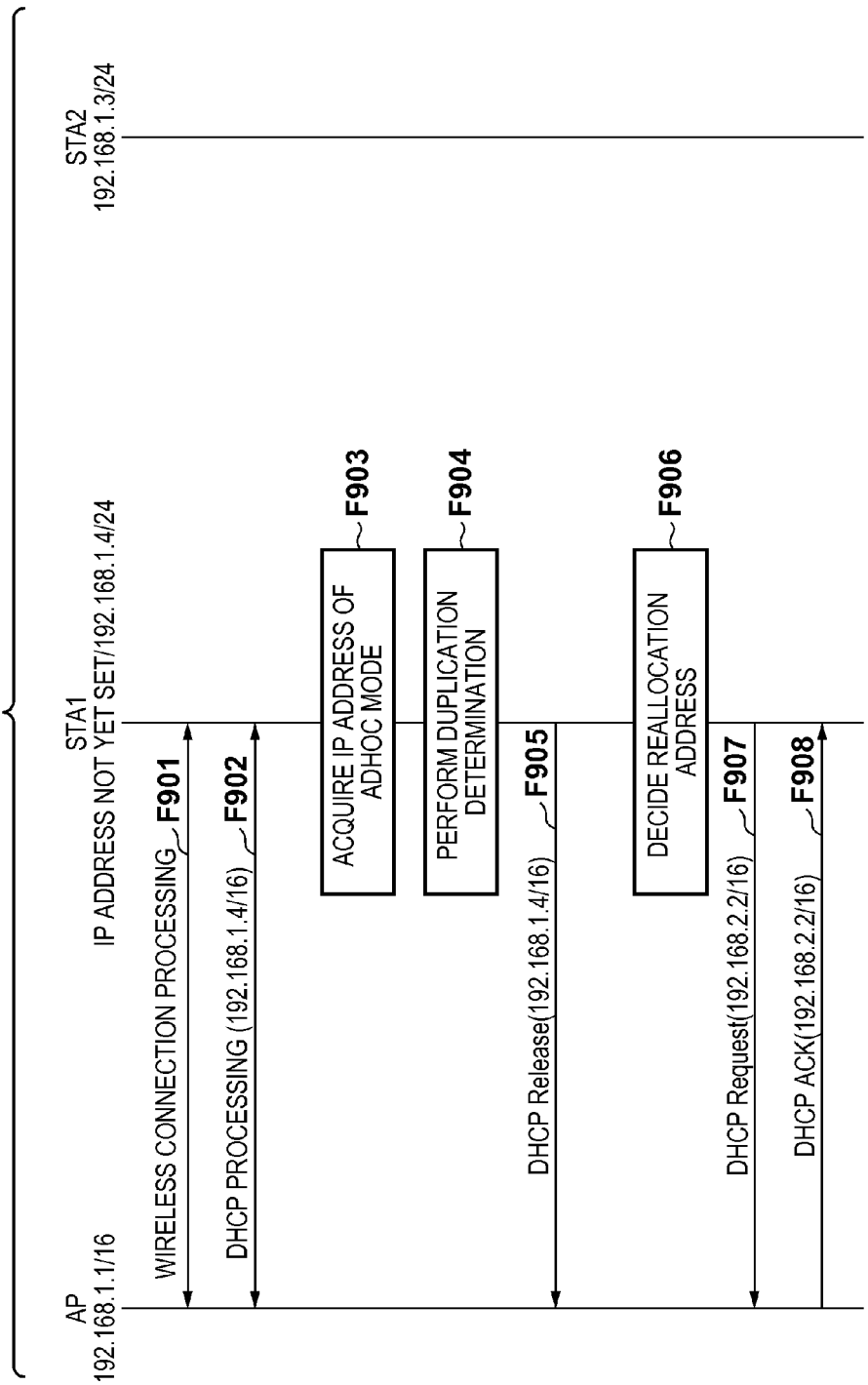

COMMUNICATION APPARATUS AND METHOD OF CONTROLLING SAME

BACKGROUND OF THE INVENTION

Field of the Invention

The present invention relates to automatic allocation of IP addresses in a communication apparatus having multiple communication interfaces.

Description of the Related Art

Wireless LAN systems typified by IEEE 802.11 have come into widespread use in recent years.

Such wireless LANs have two modes, namely an infrastructure mode and an adhoc mode. In the infrastructure mode, an infrastructure network is formed by an access point ("AP" below), which manages the wireless network, and a communication terminal (a station or "STA" below), which communicates upon being connected to the wireless network. Data communication by the STA in the infrastructure network is performed via the AP at all times.

With an infrastructure network, communication with a wide-area network ("WAN" below) is possible via the AP. To accomplish this, data communication generally uses routable addresses allocated by a DHCP server within the LAN or by a DHCP server function incorporated within the AP.

The term "routable address" refers to an IP address that is transferable to a router. In a case where a NAT is used, generally an address allocated by the DHCP protocol uses a private address. Addresses 192.168.0.0 to 192.168.255.255 are examples of private addresses utilized in IPv4.

In the adhoc mode, on the other hand, an adhoc network is formed by a STA alone and does not require a device to manage the wireless network. Data communication in an adhoc network is directly carried out between STAs. Further, in an adhoc network, in view of the absence of a device for managing the network, data communication generally uses link-local addresses by Auto IP or private addresses manually.

Here, addresses 169.254.0.0 to 169.254.255.255 are utilized as link-local addresses in IPv4.

Devices capable of operating in both the infrastructure mode and adhoc mode simultaneously and devices capable of functioning as both an AP and a STA simultaneously have been developed in recent years (see Japanese Patent Laid-Open No. 2005-086350). An arrangement that can be adopted for implementing these functions is to individually provide wireless hardware for implementing the respective functions. However, since this results in a commensurate rise in cost, most devices make common use of a single item of wireless hardware for each of the functions.

Generally, in such devices, the infrastructure mode and the adhoc mode or the AP and STA are managed internally as respective ones of separate communication interfaces. Consequently, this makes necessary control similar to that of a device physically having multiple interfaces.

In a case where wireless hardware is shared by a plurality of functions, it is possible to use MAC addresses that differ for each function. However, it is also possible to use a single MAC address. Which method is adopted depends upon the implementation by the vendor that provides the communication interface (or "IF"), and in most cases the selection cannot be made by the set maker, etc., who receives the provision of the communication IF.

Further, the method generally used with such a device is to manage each function as a different communication IF. For example, control is exercised such that the AP function is managed as IF-1, the STA function is managed as IF-2, data to be communicated using the AP function is transmitted to the IF-1 and data to be communicated using the STA function is transmitted to the IF-2.

However, in the case where a single MAC address is used, a situation which arises is that multiple communication interfaces will have the same MAC address. As a consequence, the link-local addresses of IPv4 or IPv6, which are generated based upon a MAC address, become identical.

In a communication apparatus equipped with a plurality of communication interfaces, if the communication application performs data communication via a socket interface, then an IP address is used to designate the communication interface to be used in data communication. However, in a case where IP addresses that have been set for multiple communication interfaces have taken on an identical value, a communication interface cannot be specified uniquely by the IP address. The problem that arises is that data communication may be carried out using an unintended communication interface.

The present invention provides a communication apparatus in which the setting of an identical IP address for multiple communication interfaces can be prevented so that an application will send and receive data via the intended communication interface.

SUMMARY OF THE INVENTION

In accordance with the present invention, there is provided a communication apparatus having a first communication interface and a second communication interface, the apparatus comprising: an acquisition unit configured to acquire a first address, which is set for the first communication interface, from another apparatus; a determination unit configured to determine whether the first address duplicates a second address that has been set for the second communication interface; and a reacquisition unit configured to reacquire a third address, which is different from the first address, from the other apparatus if the determination unit has determined that the first address duplicates the second address.

In accordance with the present invention, the setting of an identical IP address for multiple communication interfaces can be prevented so that an application will send and receive data via the intended communication interface.

Further features of the present invention will become apparent from the following description of exemplary embodiments (with reference to the attached drawings).

BRIEF DESCRIPTION OF THE DRAWINGS

FIG. 9 is sequence diagram in a case where an IP address is automatically allocated according to the third embodiment.

DESCRIPTION OF THE EMBODIMENTS

A communication apparatus according to the embodiments will now be described in detail with reference to the drawings.

Here an example will be described in which use is made of a wireless LAN system compliant with the IEEE 802.11 standard. However, the form of communication is not necessarily limit to wireless LAN compliant with IEEE 802.11.

First Embodiment

Figure 1:
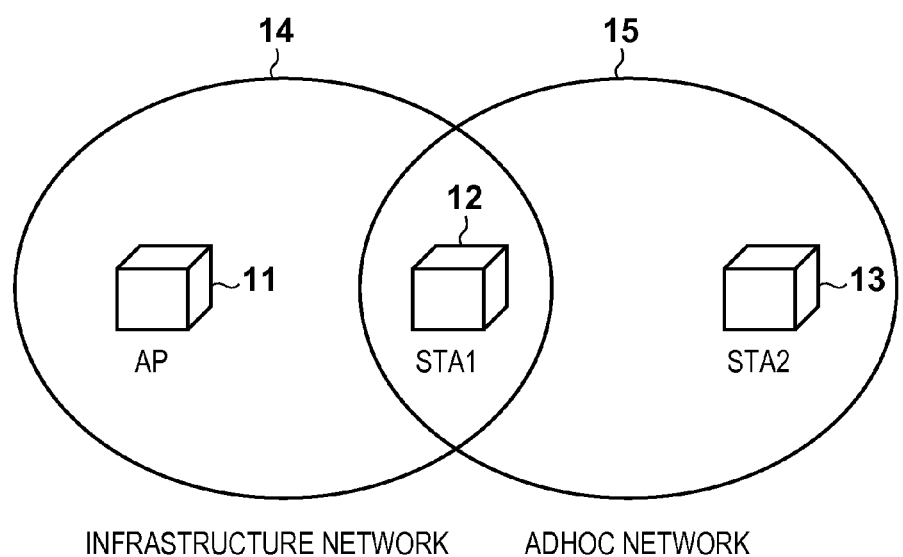
FIG. 1 is a diagram illustrating a network configuration according to a first embodiment of the present invention.

FIG. 1 is a diagram illustrating the configuration of a network system that includes a first communication apparatus ("STA1" below) according to this embodiment, an access point ("AP" below) and second and third communication apparatuses ("STA2" and "STA3" below), respectively.

The AP, indicated at 11, forms and manages an infrastructure network 14 of a wireless LAN. The AP 11 is connected to a WAN, and a terminal under the supervision of the infrastructure network 14 is capable of communicating with the WAN via the AP 11.

The STA1, which is indicated at 12 and is capable of functioning simultaneously in both the infrastructure and adhoc modes, is connected to the infrastructure network 14 in the infrastructure mode. Further, the STA1 forms an adhoc network 15 in the adhoc mode.

The STA2, which is indicated at 13, forms the adhoc network 15 in a manner similar to that of the STA1. The infrastructure network 14 and adhoc network 15 operate independently and their network identifiers ("SSIDs" below), authentication schemes and encryption schemes, etc., may differ from each other.

Figure 2:
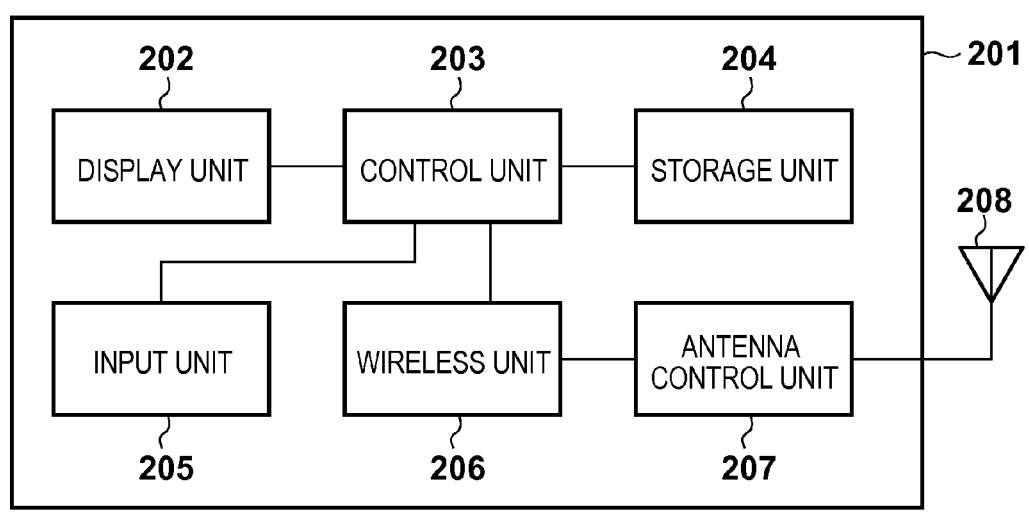
FIG. 2 is a function block diagram illustrating the configuration of a communication apparatus according to the first embodiment.

FIG. 2 is a function block diagram illustrating an example of the configuration of the communication apparatus 12 (STA1).

The entire apparatus is indicated at 201 and has a display unit 202 equipped with an LCD or LED, which functions to output information capable of being perceived visually, and/or a speaker having an audio output function, and presents a variety of displays. A control unit 203 controls the overall apparatus by executing a control program stored in a storage unit 204. The storage unit 204 stores the control program executed by the control unit 203. Various operations described later are performed by having the control unit 203 execute the control program stored in the memory unit 204. An input unit 205 is used by a user in order to specify a limit on number of network terminals, described later. A wireless unit 206 performs wireless communication and is equipped with a communication IF (first communication interface) for the infrastructure mode and a communication iF (second communication interface) for the adhoc mode. An antenna control unit 207 controls an antenna 208.

Thus, the communication apparatus 12 is a communication apparatus having multiple communication interfaces that include the first communication interface and the second communication interface and is connected to the network by each of these communication interfaces. Further, a first IP address is set for the first communication interface and a second IP address, which is different from the first IP address, is set for the second communication interface. It should be noted that in a case where the first and second IP addresses are redundant, a third IP address different from the first and second IP addresses is set for one of the communication interfaces.

It should be noted that although the configurations of communication apparatus 11 (AP) and communication apparatus 13 (STA2) are similar to that shown in FIG. 2, the necessary communication interfaces are implemented in the wireless sections.

Figure 3:
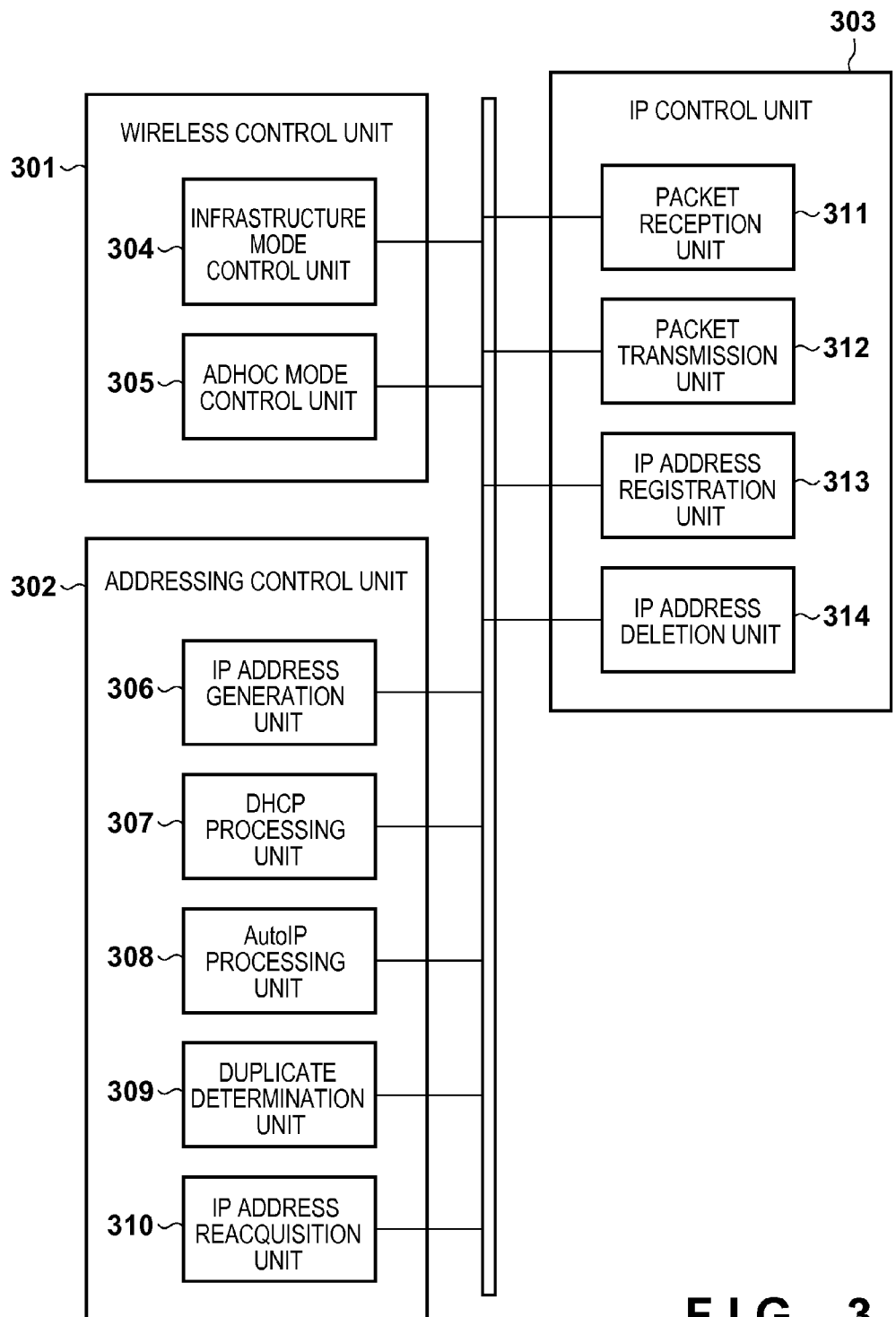
FIG. 3 is a block diagram illustrating an arrangement of software function blocks according to the first embodiment.

FIG. 3 is a block diagram illustrating an example of an arrangement of software function blocks implemented by the control unit 203.

A wireless control unit 301 is for controlling the wireless unit 206 and includes an infrastructure mode control unit 304 to control wireless communication in the infrastructure mode, and an adhoc mode control unit 305 to control wireless communication in the adhoc mode.

An addressing control unit 302 is for controlling the addressing of the Internet Protocol ("IP" below). The addressing control unit 302 includes an IP address generation unit 306 for generating, by a predetermined method, an IP address allocated to a communication interface; a Dynamic Host Configuration Protocol ("DHCP" below) processing unit 307 for executing the protocol processing of the DHCP protocol; an AutoIP processing unit 308 for executing the protocol processing of the AutoIP protocol; a duplicate determination unit 309 for determining whether IP addresses are redundant within the device; and an IP address reacquisition unit 310 which, in a case where the duplicate determination unit 309 has determined that an IP address is a duplicate, acquires a different IP address.

An IP control unit 303 exercises IP communication control and includes a packet reception unit 311 for receiving packets used in communication; a packet transmission unit 312 for transmitting packets used in communication; an IP address registration unit 313 for registering an IP address with respect to a communication interface; and an IP address deletion unit 314 for deleting the IP address of a communication interface.

Figure 4:
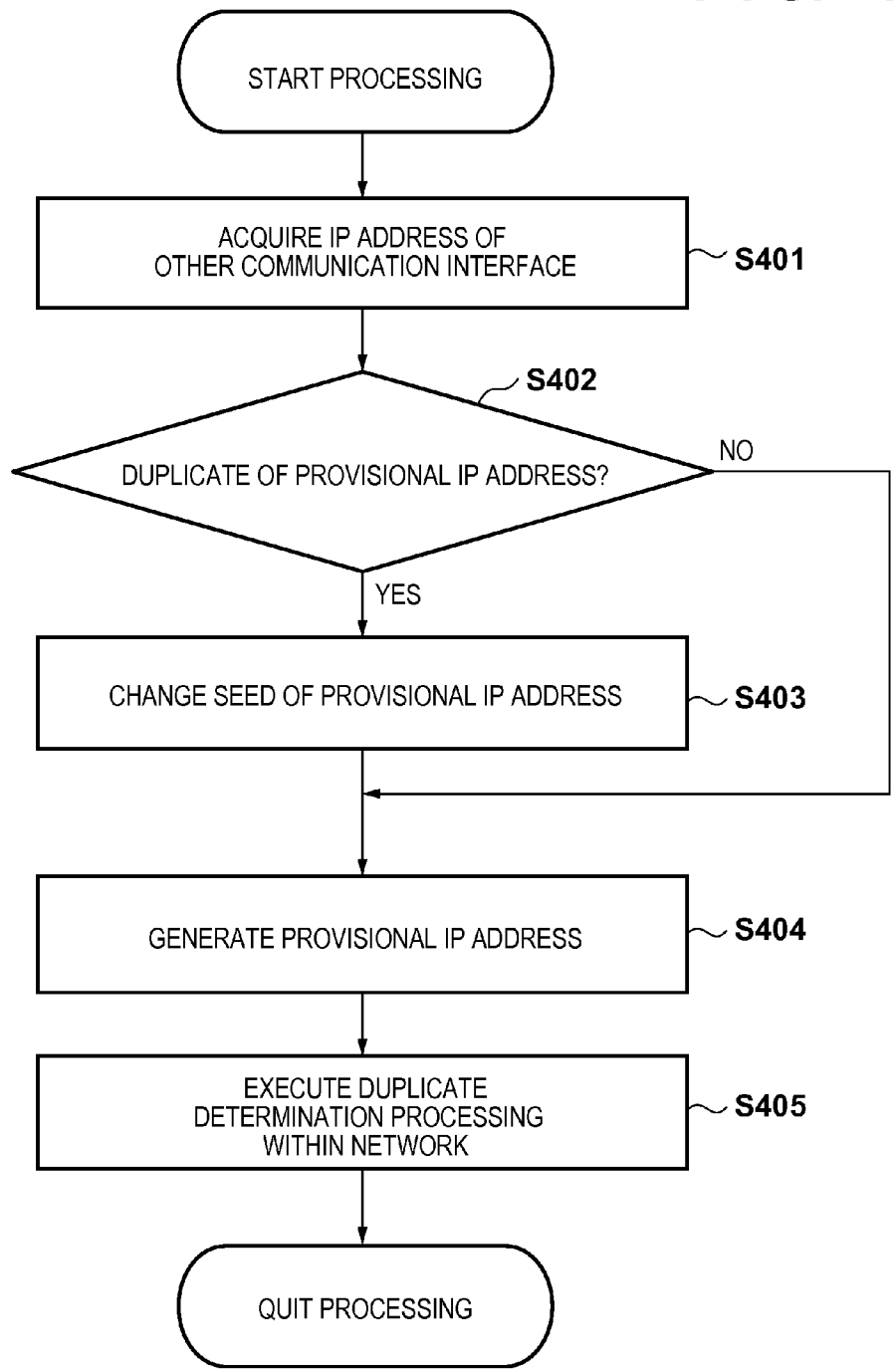
FIG. 4 is a flowchart illustrating processing for automatically allocating an IP address according to the first embodiment.

FIG. 4 is a flowchart illustrating processing for automatically allocating an IP address of the communication apparatus 12 (STA1).

The STA1 uses the wireless control unit 301 to acquire an IP address that has been set for another communication interface (step S401). Using the duplicate determination unit 309, the STA1 determines whether the acquired IP address duplicates a provisional IP address, which is generated by AutoIP, to be set for a communication interface whose IP address has not yet been set (step S402). As for methods of making this determination, it is possible to compare the acquired IP address with the result of generating the provisional IP address by a predetermined method, or the duplication determination can be made based upon the fact that the address has been set as a link-local address of another communication interface having the same MAC address.

If it is determined that the acquired IP address is a duplicate of the provisional IP address ("YES" at step S402), the STA1 uses the IP address reacquisition unit 310 to change the seed that is for generating the provisional IP address (step S403). As for methods of changing the seed, this can be implemented by inverting the G/L bit of the MAC address of the communication interface used generally, or by using some other method. Next, the STA1 uses the IP address generation unit 306 to generate the provisional IP address by using the changed seed (step S404).

On the other hand, if it is determined that the acquired IP address is not a duplicate of the provisional IP address ("NO" at step S402), the STA1 uses the IP address generation unit 306 to generate the provisional IP address without changing the seed (step S404).

When the provisional IP address is generated, the STA1 uses the AutoIP processing unit 308 to execute duplicate determination processing to determine whether an identical IP address is being used within the network (step S405). This method can be implemented in accordance with the protocol of AutoIP. Other methods may be used as well.

When processing ends, the STA1 sets the IP address for the communication interface using the IP address registration unit 313 and becomes capable of performing data communication using this communication interface.

Figure 5:
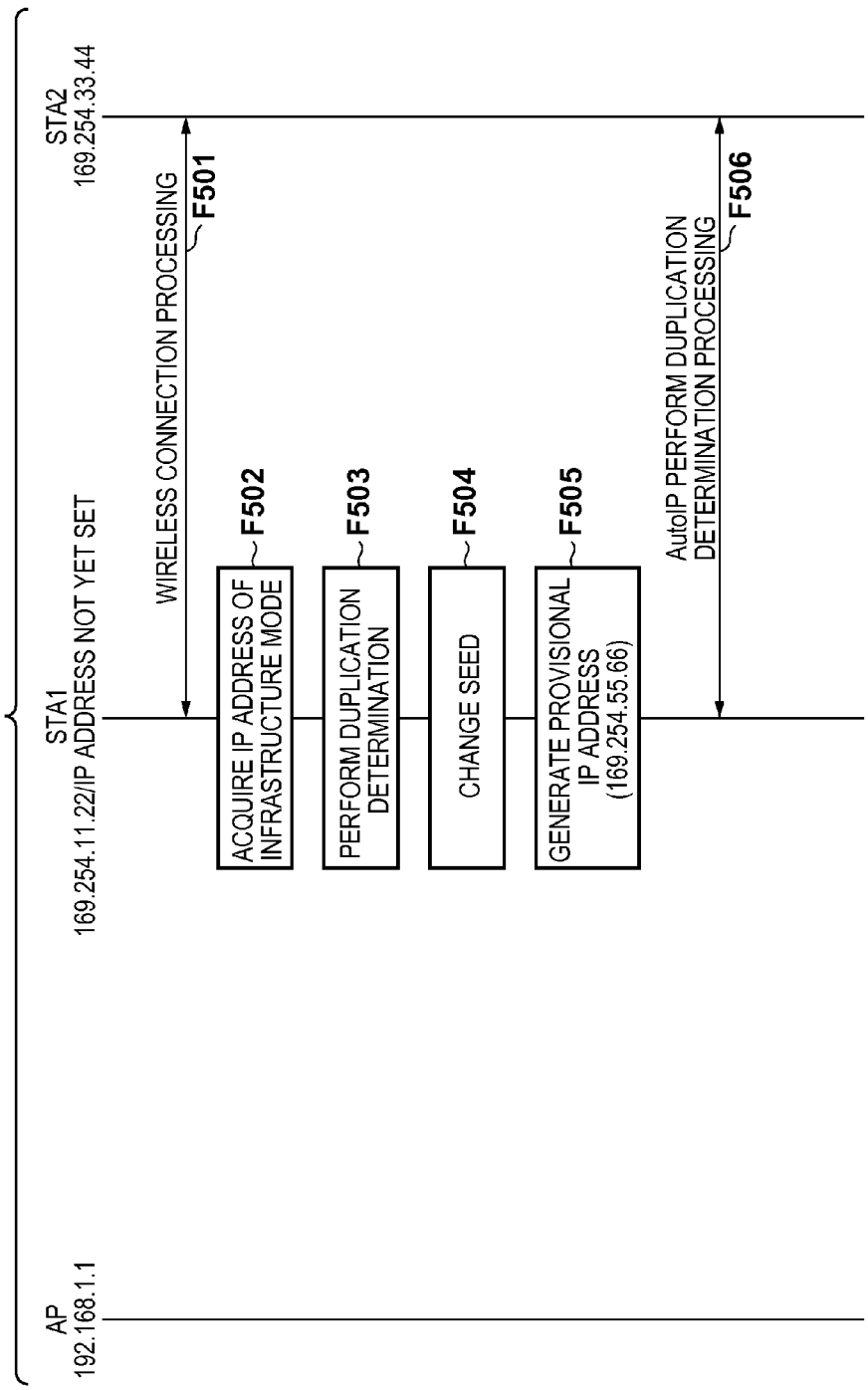
FIG. 5 is sequence diagram in a case where an IP address is automatically allocated according to the first embodiment.

FIG. 5 is sequence diagram in a case where the STA1 is connected to the infrastructure network constructed by the AP, the STA1 is connected to an adhoc network in a state in which the STA2 has constructed this adhoc network, and automatic allocation of an IP address is executed.

Here "192.168.1.1" has been set as the IP address of the AP and "169.254.11.22" has been set for the communication interface of the infrastructure mode of STA1. Further, "169.254.33.44" has been set as the IP address of STA2 within the adhoc network.

Using the adhoc mode control unit 305, the STA1 executes processing for wirelessly connecting to the adhoc network (F501).

Next, using the infrastructure mode control unit 304, the STA1 acquires an IP address that has been allocated to the communication interface of the infrastructure mode (F502). In this example, "169.254.11.22" is acquired.

Using the IP address generation unit 306, the STA1 generates a provisional IP address through a predetermined method using the MAC address of the communication interface of the adhoc mode. If we assume that this generated provisional IP address is "169.254.11.22", the STA1 uses the duplicate determination unit 309 to determine that this address duplicates the IP address that has been set (F503). Using the IP address reacquisition unit 310, the STA1 changes the value of the MAC address used as the seed of the provisional IP address (F504). At this time it is not necessary to change the MAC address of the actual communication interface.

Using the IP address generation unit 306, the STA1 generates a provisional IP address by using the changed seed (F505). In this example, the STA1 generates "169.254.55.66". When the provisional IP address is generated, the STA1 uses the AutoIP processing unit 308 to execute duplication determination processing in accordance with the protocol of AutoIP (F506).

If no duplication of IP addresses within the network is confirmed by duplication determination processing, the STA1 uses the IP address registration unit 313 to set the generated provisional IP address for the communication interface of the adhoc mode. On the other hand, if duplication of IP addresses within the network is confirmed by duplication determination processing, then the STA1 generates a provisional IP address that is different from the provisional IP address generated previously, executes duplication determination processing again and repeats the generation of a provisional IP address until no duplication is confirmed.

Thus, in accordance with the first embodiment as described above, if a provisional IP address generated by AutoIP duplicates an IP address that has been set for another communication interface, control is exercised in such a manner that a different provisional IP address is used. As a result, it is possible to prevent the same IP address from being set for multiple communication interfaces in AutoIP.

Second Embodiment

It should be noted that the configuration of a network system and the configuration of communication apparatuses in a second embodiment are the same as those of the first embodiment described with reference to FIGS. 1 to 3 and need not be described again.

In the second embodiment, operation will be described for a case where the STA1 executes automatic allocation of an IP address by the DHCP protocol using a communication interface of the infrastructure mode.

Figure 6:
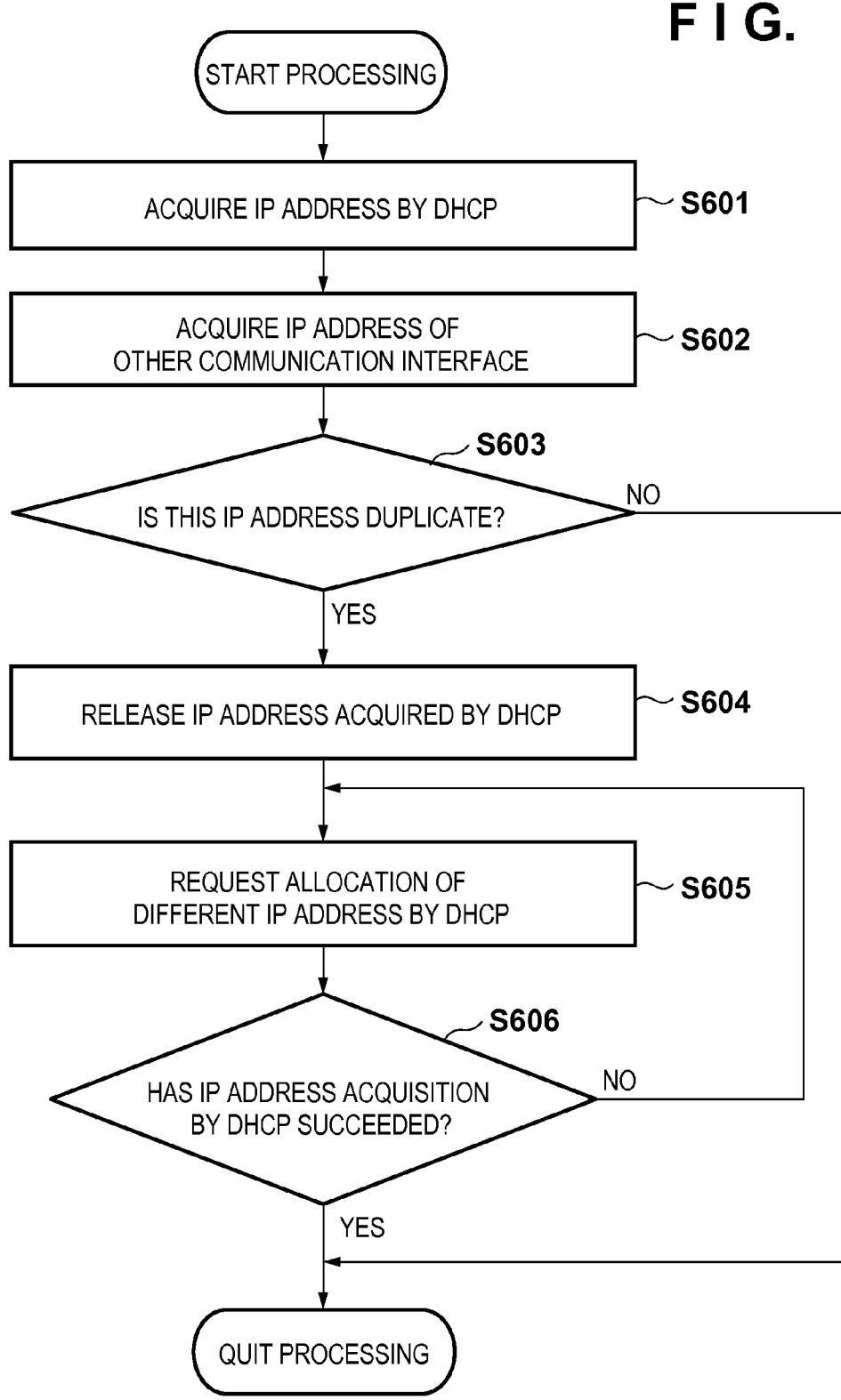
FIG. 6 is a flowchart illustrating processing for automatically allocating an IP address according to a second embodiment of the present invention.

FIG. 6 is a flowchart illustrating processing for automatically allocating an IP address of the communication apparatus 12 (STA1).

The STA1 uses the DHCP processing unit 307 to acquire an IP address from a DHCP server (step S601). In a case where the DHCP client queries the DHCP server the first time, the DHCP processing unit 307 cannot ascertain the range of IP addresses distributed by the DHCP server. In general, therefore, the DHCP processing unit 307 requests any IP address. Implementation is possible by similarly requesting any IP address at step S601 as well.

Next, using the wireless control unit 301, the STA1 acquires the IP address of a communication interface whose IP address has not yet been set (step S602). Using the duplicate determination unit 309, the STA1 determines whether the IP address acquired at step S602 duplicates the IP address acquired at step S601 (step S603).

If it is determined that the IP addresses are not redundant ("NO" at step S603), the STA1 exits processing and sets the IP address, which has been acquired by the DHCP protocol, for the communication interface.

On the other hand, if it is determined that the IP addresses are redundant ("YES" at step S603), then the STA1 releases the IP address acquired at step S601 (leased by DHCP) by the DHCP processing unit 307 (step S604). A method of release that can be used is to transmit a DHCP release packet to the DHCP server.

If the IP address acquired (leased by DHCP) at step S601 is released, the STA1 uses the DHCP processing unit 307 to request acquisition of an IP address that is different from the IP address acquired at step S601 (step S605). A method of requesting the IP address that can be used is to set the requested IP address in a DHCP request packet in a case where automatic allocation processing based upon DHCP is executed again.

Next, using the duplicate determination unit 309, the STA1 determines whether acquisition of the IP address requested at step S605 succeeded (step S606). If acquisition has failed ("NO" at step S606), control returns to step S605. A case where acquisition fails refers to a case where the IP address was not leased from DHCP owing to a communication error, and also a case where, for example, an IP address identical with an IP address determined to be a duplicate was leased from DHCP once again. On the other hand, if acquisition has succeeded ("YES" at step S606), then the STA1 exits processing and uses the IP address registration unit 313 to set the IP address, which has been acquired at step S606, for the communication interface.

Figure 7:
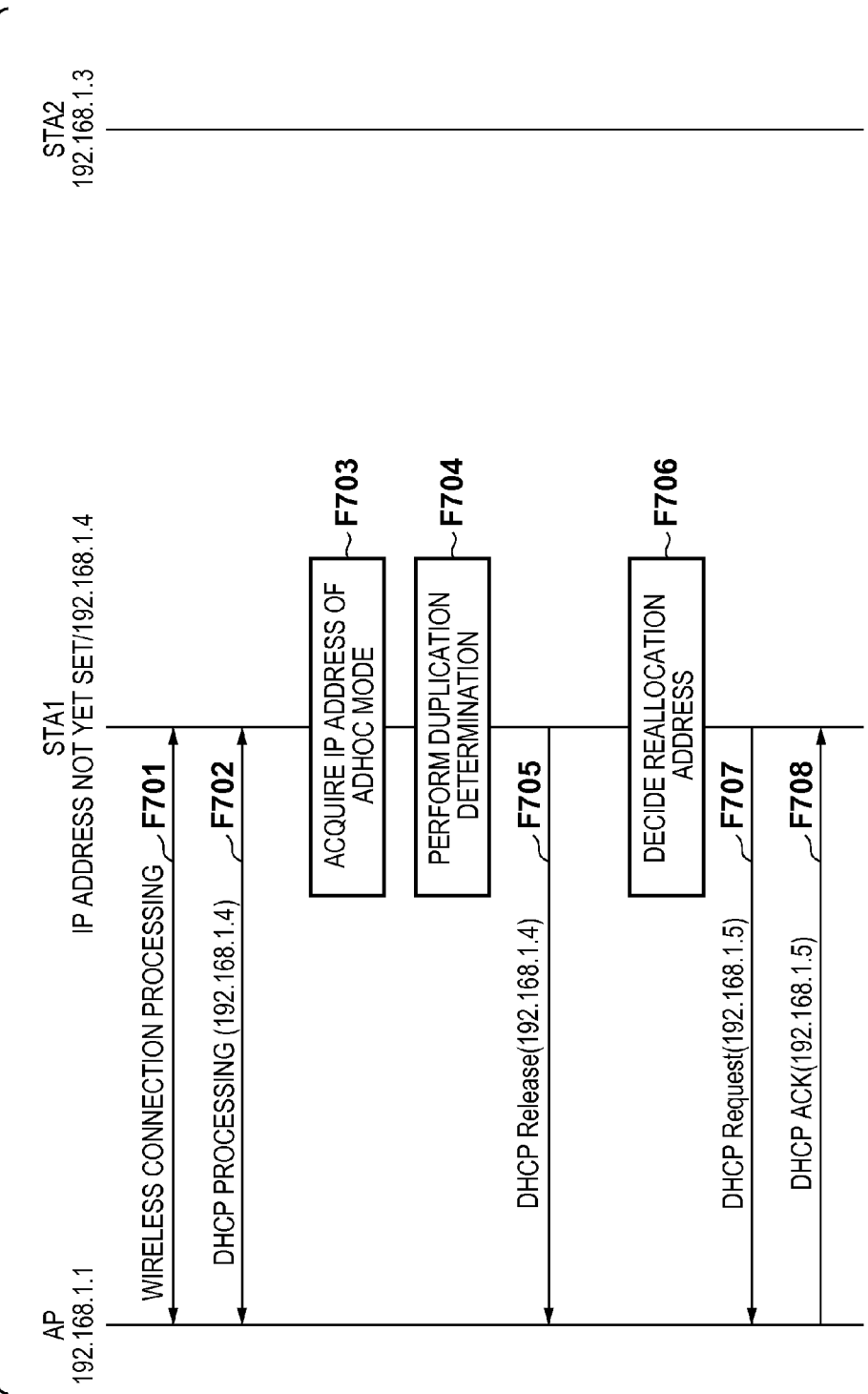
FIG. 7 is sequence diagram in a case where an IP address is automatically allocated according to the second embodiment.

FIG. 7 is sequence diagram in a case where the STA1 and the STA2 construct an adhoc network, the STA1 is connected to the infrastructure network constructed by the AP, and automatic allocation of an IP address is executed.

Here the IP address of the AP has been set to "192.168.1.1", the AP has an internal DHCP server, and automatic allocation of an IP address by the DHCP protocol is possible in the infrastructure network. Further, in the adhoc network, the IP address of the STA2 has been set to "192.168.1.3" and the IP address of the STA1 has been set to "192.168.1.4".

The STA1 uses the infrastructure mode control unit 304 to execute processing for wirelessly connecting to the infrastructure network (F701). When the connection is achieved, the STA1 uses the DHCP processing unit 307 to execute IP address automatic allocation processing based upon DHCP (F702). In this example, the IP address "192.168.1.4" is acquired by the DHCP processing unit 307 (F702). When DHCP processing is completed, the STA1 acquires the IP address of the adhoc mode by the adhoc mode control unit 305. In this example, the STA1 acquires the IP address "192.168.1.4".

Next, using the duplicate determination unit 309, the STA1 compares the IP address acquired at F702 and the IP address acquired at F703 and determines whether duplication has occurred (F704).

If the result of the determination is that the IP addresses are redundant, the STA1 uses the DHCP processing unit 307 to transmit a DHCP release packet to the AP in order to release the IP address acquired at F702 (F705).

Next, the STA1 uses the IP address reacquisition unit 310 to decide the requested IP address in a case where automatic allocation based upon DHCP is performed again (F706). As for a method of deciding the requested IP address, it is possible to decide the IP address from the IP address information (e.g., IP address is "192.168.1.4", net mask is "255.255.255.0", optional information) acquired at F702.

For example, from this IP address information it can be determined that IP addresses utilizable in this network are "192.168.1.1" to "192.168.1.255". Further, since "192.168.1.1" has been set for the DHCP server (the AP in this example) and the IP address acquired at F701 is "192.168.1.4", these IP addresses are excluded. In addition, cases where IP addresses such as the IP address of a DNS server or the IP address of a gateway have been acquired as IP address information can be excluded.

At F706, assume that "192.168.1.5" has been decided as an IP address to be requested again. When the IP address requested is decided, the STA1 uses the DHCP processing unit 307 to set the request IP address in a DHCP request packet and to transmit this DHCP request packet to the DHCP server (F707).

When the DHCP request packet is received, the AP confirms that the requested IP address is capable of being released and transmits DHCP ACK to the STA1 (F708).

When acquisition of the IP address based upon DHCP succeeds, the STA1 uses the IP address registration unit 313 to set this IP address for the communication interface of the infrastructure mode.

Thus, in accordance with the second embodiment as described above, if an IP address acquired using the DHCP protocol duplicates an IP address that has been set for another communication interface, this IP address is released and a different IP address is acquired again. As a result, it is possible to prevent the same IP address from being set for multiple communication interfaces in a case where an IP address is set using the DHCP protocol.

Third Embodiment

It should be noted that the configuration of a network system and the configuration of communication apparatuses in a third embodiment are the same as those of the first embodiment described with reference to FIGS. 1 to 3 and need not be described again.

In the third embodiment, operation will be described for a case where the STA1 executes automatic allocation of an IP address by the DHCP protocol using a communication interface of the infrastructure mode.

Figure 8:
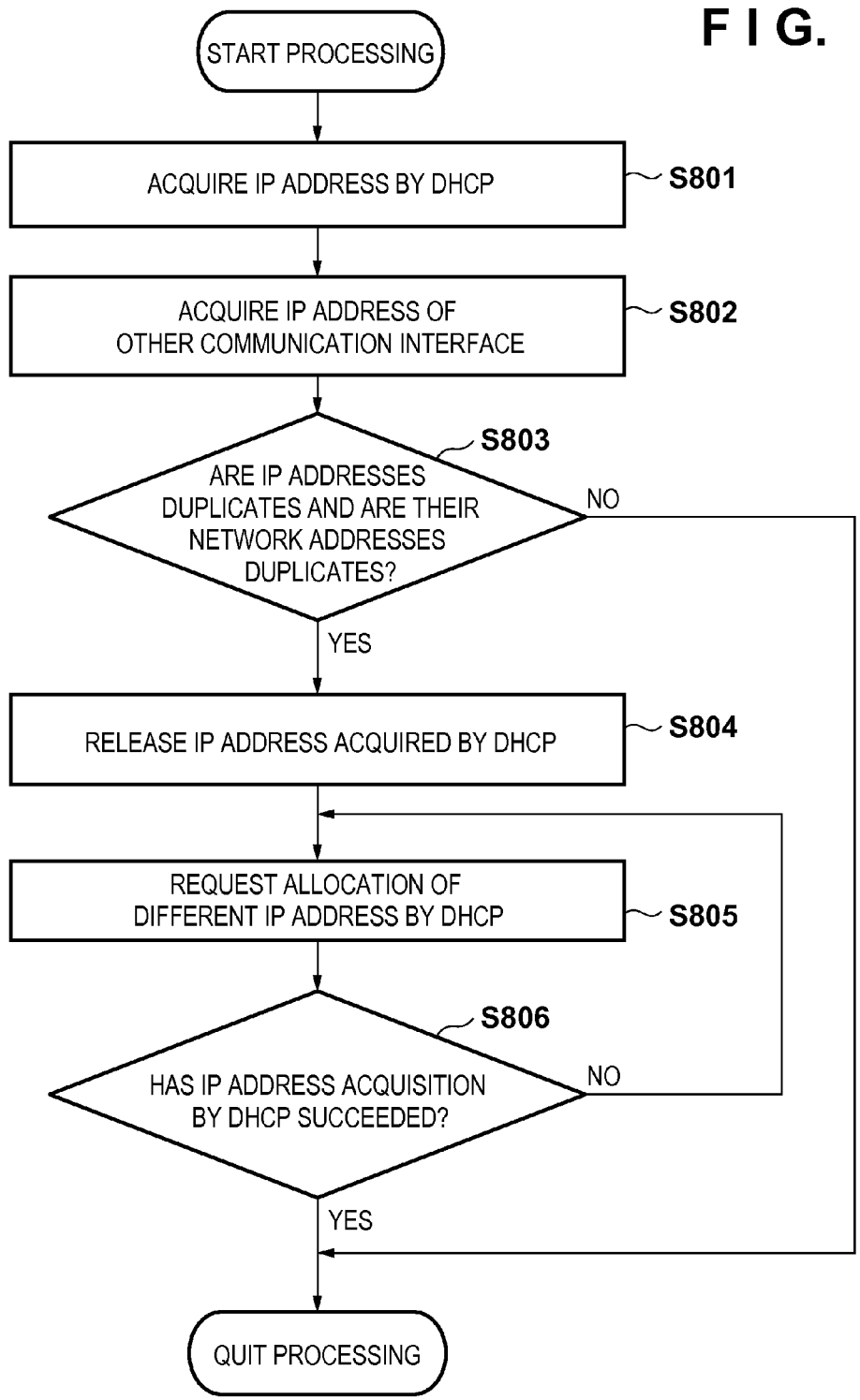
FIG. 8 is a flowchart illustrating processing for automatically allocating an IP address according to a third embodiment of the present invention.

FIG. 8 is a flowchart illustrating processing for automatically allocating an IP address of the communication apparatus 12 (STA1).

It should be noted that the processing of steps S801, S802, S804 and S806 is similar to the processing of steps S601, S602, S604 and S606 of FIG. 6 and need not be described again.

Using the duplicate determination unit 309, the STA1 determines whether the IP address acquired at step S801 and the network address thereof duplicate the IP address acquired at step S802 and the network address thereof (step S803). If it is determined that the IP addresses are not redundant and that the network addresses are not redundant ("NO" at step S803), the STA1 exits processing and sets the IP address, which has been acquired by the DHCP protocol, for the communication interface using the IP address registration unit 313.

On the other hand, if it is determined that the IP addresses are redundant and that the network addresses are redundant ("YES" at step S803), the STA1, through the processing of step S804, uses the IP address reacquisition unit 310 to request acquisition of an IP address that is different from the IP address acquired at step S801 (step S805). If it is determined that it is possible to avoid duplication of network addresses, then control is exercised at step S805 in such a manner that the IP address of a different network address is requested. For example, if the IP address acquired at step S802 is "192.168.1.4/24" and the IP address acquired at step S801 is "192.168.1.4/16", then the STA1 requests IP addresses "192.168.2.1" to "192.168.255.255".

This is followed by execution of step S806.

FIG. 9 is sequence diagram in a case where the STA1 and the STA2 construct an adhoc network, the STA1 is connected to the infrastructure network constructed by the AP, and automatic allocation of an IP address is executed.

Here the IP address of the AP has been set to "192.168.1.1/16", the AP has an internal DHCP server, and automatic allocation of an IP address by the DHCP protocol is possible in the infrastructure network. Further, in the adhoc network, the IP address of the STA2 has been set to "192.168.1.3/24" and the IP address of the STA1 has been set to "192.168.1.4/24".

The processing at F901 to F903 is similar to that at F701 to F703 in FIG. 7 and need not be described again. However, it is assumed that "192.168.1.1/16" is acquired as the IP address at F902 and that "192.168.1.1/24" is acquired as the IP address at F903.

Next, using the duplicate determination unit 309, the STA1 compares the IP address acquired at F902 and the network address thereof with the IP address acquired at F903 and the network address thereof and determines whether duplication has occurred (F904).

If the result of the determination is that the IP addresses are redundant and that the network addresses are redundant, the STA1 uses the DHCP processing unit 307 to transmit a DHCP release packet to the AP in order to release the IP address acquired at F902 (F905).

Next, the STA1 uses the IP address reacquisition unit 310 to decide the requested IP address in a case where automatic allocation based upon DHCP is performed again (F906). As for a method of deciding the requested IP address, it is possible to decide the IP address from the IP address information (e.g., IP address is "192.168.1.4", net mask is "255.255.255.0", optional information) acquired at F902.

For example, from this IP address information it can be determined that IP addresses utilizable in this network fall within an address-space range of "192.168.0.0" to "192.168.255.255". Further, based upon the IP address information acquired at F903, an address space of "192.168.1.0" to "192.168.1.255" is excluded (i.e., is out of the range).

At F906, assume that "192.168.2.2/16" has been decided as an IP address to be requested again. When the IP address requested is decided, the STA1 uses the DHCP processing unit 307 to transmit a DHCP request packet to the DHCP server (F907) in a manner similar to that at F707 in FIG. 7.

The AP transmits DHCP ACK to the STA1 (F908) in a manner similar to that F708.

When acquisition of the IP address based upon DHCP succeeds, the STA1 uses the IP address registration unit 313 to set this IP address for the communication interface of the infrastructure mode.

Thus, in accordance with the third embodiment as described above, if a network address acquired using the DHCP protocol duplicates a network address that has been set for another communication interface, this IP address is released and a different IP address is acquired again. As a result, it is possible to prevent an IP address of the same network address from being set for multiple communication interfaces in a case where an IP address is set using the DHCP protocol.

Fourth Embodiment

It should be noted that the configuration of a network system and the configuration of communication apparatuses in a fourth embodiment are the same as those of the first embodiment described with reference to FIGS. 1 to 3 and need not be described again.

In the fourth embodiment, operation will be described for a case where the STA1 executes automatic allocation of an IP address by the DHCP protocol using a communication interface of the infrastructure mode. Further, operation will be described for a case where the STA1 acquired an IP address from the AP in the past using the DHCP protocol, disconnects from the network and then reconnects to the network.

The STA1 stores an IP address, which it acquired in the past, in the IP address registration unit 313 and uses the duplicate determination unit 309 to determine whether this IP address is the same as the IP address of the adhoc mode. If the result of the determination is that the IP address is different, then, using the DHCP protocol, the STA1 requests the IP address that was acquired in the past. Further, if an identical IP address is acquired, then the STA1 requests a different IP address using the DHCP protocol.

Thus, in accordance with the fourth embodiment as described above, before an IP address acquired in the past is about to be acquired again by the DHCP protocol, it is determined whether this IP address duplicates the IP address of another communication interface, and if occurrence of duplication is determined, then a different IP address is requested. This means that as a result of the duplication determination, it is unnecessary to execute IP address acquisition processing (IP address reacquisition processing) a second time, thereby making it possible to shorten the time it takes to complete the setting of the IP address.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application 2012-125145 filed on May 31, 2012, which is hereby incorporated by reference herein in its entirety.

What is claimed is:

1. A communication apparatus comprising:
   one or more processors; and
   one or more memories including instructions that, when executed by the processor(s), cause the apparatus to:
   set a first address, which is used by the communication apparatus in a first wireless network;
   join the first wireless network, and newly join a second wireless network while keeping joining the first wireless network;
   determine, when newly joining the second wireless network, whether or not a network address part of the first address is in common with a first network address that the communication apparatus attempts to use in the second wireless network; and
   set a second address that the communication apparatus uses in the second wireless network in accordance with a result of the determine,
   wherein the communication apparatus sets, in a case where the network address part of the first address is in common with the first network address, an address obtained using a second network address different from the first network address as the second address, without changing an address used by the communication apparatus in the first wireless network from the first address that has been set, and
   wherein the communication apparatus sets, in a case where the network address part of the first address is not in common with the first network address, an address obtained using the first network address as the second address, without changing an address used by the communication apparatus in the first wireless network from the first address that has been set.

2. The apparatus according to claim 1, wherein the first wireless network is an infrastructure network created by an access point.

3. The apparatus according to claim 1, wherein the first address and the second address are IP addresses.

4. A method of controlling a communication apparatus, comprising:

a first setting step of setting a first address, which is used by the communication apparatus in a first wireless network;
a joining step of joining the first wireless network, and of newly joining a second wireless network while keeping joining the first wireless network;
a determination step of determining, when newly joining the second wireless network, whether or not a network address part of the first address is in common with a first network address that the communication apparatus attempts to use in the second wireless network; and
a second setting step of setting a second address that the communication apparatus uses in the second wireless network in accordance with a result of the determination in the determination step,
wherein in the second setting step, in a case where the network address part of the first address is in common with the first network address, an address obtained using a second network address different from the first network address is set as the second address, without changing an address used by the communication apparatus in the first wireless network from the first address that has been set in the first setting step, and
wherein in the second setting step, in a case where the network address part of the first address is not in common with the first network address, an address obtained using the first network address is set as the second address, without changing an address used by the communication apparatus in the first wireless network from the first address that has been set in the first setting step.

5. A non-transitory computer-readable storage medium storing a program for causing a computer to control a communication apparatus, the computer being made to function as:
a first setting unit configured to set a first address, which is used by the communication apparatus in a first wireless network;
a joining unit configured to join the first wireless network, and to newly join a second wireless network while keeping joining the first wireless network;
a determination unit configured to determine, when newly joining the second wireless network using the joining unit, whether or not a network address part of the first address is in common with a first network address that the communication apparatus attempts to use in the second wireless network; and
a second setting unit configured to set a second address that the communication apparatus uses in the second wireless network in accordance with a result of the determination by the determination unit,
wherein the second setting unit sets, in a case where the network address part of the first address is in common with the first network address, an address obtained using a second network address different from the first network address as the second address, without changing an address used by the communication apparatus in the first wireless network from the first address that has been set by the first setting unit, and
wherein the second setting unit sets, in a case where the network address part of the first address is not in common with the first network address, an address obtained using the first network address as the second address, without changing an address used by the communication apparatus in the first wireless network from the first address that has been set by the first setting unit.

6. The apparatus according to claim 1, wherein:
the communication apparatus obtains, from a DHCP server, the second address that the communication apparatus attempts to use in the second wireless network.

7. The apparatus according to claim 1, wherein the first wireless network is a wireless network compliant with IEEE802.11 series.

8. The apparatus according to claim 1, wherein the second wireless network is a wireless network compliant with IEEE802.11 series.

9. The apparatus according to claim 1, further comprising:
a first communication interface configured to connect to the first wireless network; and
a second communication interface configured to connect to the second wireless network.

10. A communication apparatus comprising:
one or more processors; and
one or more memories including instructions that, when executed by the processor(s), cause the apparatus to:
set a first address, which is used by the communication apparatus in a first wireless network;
join the first wireless network, and newly join a second wireless network while keeping joining the first wireless network;
determine, when newly joining the second wireless network, whether or not the first address is in common with a second address that the communication apparatus attempts to use in the second wireless network; and
set a third address that the communication apparatus uses in the second wireless network in accordance with a result of the determine,
wherein the communication apparatus sets, in a case where the first address is in common with the second address, an address different from the second address as the third address, without changing an address used by the communication apparatus in the first wireless network from the first address that has been set, and
wherein the communication apparatus sets, in a case where the first address is not in common with the second address, the second address as the third address, without changing an address used by the communication apparatus in the first wireless network from the first address that has been set.

11. The apparatus according to claim 10, wherein:
the communication apparatus generates the second address that the communication apparatus attempts to use in the second wireless network in accordance with a protocol compliant with Auto IP.

12. The apparatus according to claim 10, wherein:
the communication apparatus obtains, from a DHCP server, the second address that the communication apparatus attempts to use in the second wireless network.

13. The apparatus according to claim 10, wherein the first wireless network is an infrastructure network created by an access point.

14. The apparatus according to claim 10, wherein the first address and the second address are IP addresses.

15. The apparatus according to claim 10, wherein the first wireless network is a wireless network compliant with IEEE802.11 series.

16. The apparatus according to claim 10, wherein the second wireless network is a wireless network compliant with IEEE802.11 series.

17. The apparatus according to claim 10, further comprising:

a first communication interface configured to connect to the first wireless network; and a second communication interface configured to connect to the second wireless network.

18. A method of controlling a communication apparatus, comprising:

a first setting step of setting a first address, which is used by the communication apparatus in a first wireless network;

a joining step of joining the first wireless network, and of newly joining a second wireless network while keeping joining the first wireless network;

a determination step of determining, when newly joining the second wireless network, whether or not the first address is in common with a second address that the communication apparatus attempts to use in the second wireless network; and a second setting step of setting a third address that the communication apparatus uses in the second wireless network in accordance with a result of the determination in the determination step, wherein in the second setting step, in a case where the first address is in common with the second address, an address different from the second address is set as the third address, without changing an address used by the communication apparatus in the first wireless network from the first address that has been set in the first setting step, and wherein in the second setting step, in a case where the first address is not in common with the second address, the second address is set as the third address, without changing an address used by the communication apparatus in the first wireless network from the first address that has been set in the first setting step.

19. A non-transitory computer-readable storage medium storing a program for causing a computer to control a communication apparatus, the computer being made to function as:

a first setting unit configured to set a first address, which is used by the communication apparatus in a first wireless network;

a joining unit configured to join the first wireless network, and to newly join a second wireless network while keeping joining the first wireless network;

a determination unit configured to determine, when newly joining the second wireless network using the joining unit, whether or not the first address is in common with a second address that the communication apparatus attempts to use in the second wireless network; and a second setting unit configured to set a third address that the communication apparatus uses in the second wireless network in accordance with a result of the determination by the determination unit, wherein the second setting unit sets, in a case where the first address is in common with the second address, an address different from the second address as the third address, without changing an address used by the communication apparatus in the first wireless network from the first address that has been set by the first setting unit, and wherein the second setting unit sets, in a case where the first address is not in common with the second address, the second address as the third address, without changing an address used by the communication apparatus in the first wireless network from the first address that has been set by the first setting unit.

* * * * *